United States Patent [19]

Ishiguro et al.

[11] 3,928,643
[45] Dec. 23, 1975

[54] METHOD OF PRODUCING A BEEF FLAVOR

[75] Inventors: Kyosuke Ishiguro, Kawasaki; Takehiko Ichikawa, Fujisawa, both of Japan

[73] Assignee: Ajinomoto Co., Inc., Tokyo, Japan

[22] Filed: Aug. 14, 1974

[21] Appl. No.: 497,273

[30] Foreign Application Priority Data

Aug. 20, 1973   Japan.................................. 48-93194

[52] U.S. Cl. ................ 426/533; 426/647; 426/657; 426/658; 426/662; 426/438
[51] Int. Cl.².................... A23L 1/226; A23L 1/227
[58] Field of Search ............. 426/65, 216, 212, 213, 426/380, 221, 222, 175, 364, 438, 647, 657, 658, 650, 662, 534, 538, 533

[56] References Cited
UNITED STATES PATENTS

| | | | |
|---|---|---|---|
| 2,241,868 | 5/1941 | Reimann.......................... | 426/364 X |
| 2,422,194 | 6/1947 | Harrington.......................... | 426/647 |
| 2,934,436 | 4/1960 | May et al............................. | 426/65 |
| 2,934,437 | 4/1960 | Morton et al......................... | 426/65 |
| 2,996,383 | 8/1961 | Gershon............................. | 426/212 X |
| 3,083,194 | 3/1963 | Thies et al. ....................... | 426/364 X |
| 3,532,514 | 10/1970 | May...................................... | 426/65 |
| 3,761,287 | 9/1973 | Jaeggi............................. | 426/364 X |

*Primary Examiner*—Robert L. Lindsay, Jr.
*Assistant Examiner*—Kenneth M. Schor
*Attorney, Agent, or Firm*—Hans Berman; Kurt Kelman

[57] ABSTRACT

When a mixture of ribose or ribose 5-phosphate with animal blood plasma solids is heated to 60° to 250°C, a beef-like flavor is observed. A seasoning composition is formed in edible solids or liquids when ribose or ribose 5-phosphate and blood plasma powder are mixed with the edible material prior to cooking, and the material then is boiled or fried or otherwise processed at adequate temperature.

5 Claims, No Drawings

METHOD OF PRODUCING A BEEF FLAVOR

This invention relates to flavoring compositions, and particularly to a method of producing a composition which imparts a beef-like flavor to food.

Many flavoring agents are known to impart a meat-like flavor to other food products. Such agents include meat extract, hydrolyzed vegetable protein, yeast extract, and mixtures of amino acids. They are widely used in the food processing industry, but supply cannot keep up with increasing demand because of lack of raw materials.

The primary object of the invention is the provision of a flavoring composition that can be prepared from raw materials readily available at low cost and imparts a meat flavor to food.

It is known from British Pat. No. 1,126,889 that ribose 5-phosphate reacts with amino acids, particularly lysine, at 100° to 250°C to produce a meat flavor composition. It has now been found that a much stronger flavor more similar to that of beef can be obtained by reaction of ribose or ribose 5-phosphate at 60° to 250°C with protein of a relatively high molecular weight, and that blood plasma of animals is a readily available, inexpensive source of such protein.

The reaction between ribose or ribose 5-phosphate and protein occurs most readily and in best yield in the presence of water, but does not involve hydrolysis of the protein prior to reaction with the ribose or ribose 5-phosphate. This is evident from the fact that the flavor produced from the hydrolyzation products of the same protein do not produce a comparably strong meat flavor with the ribose or ribose 5-phosphate.

Other proteins of animal origin react with ribose or ribose 5-phosphate in the same manner as blood plasma solids, but are not economically attractive at this time. The seasoning composition of the invention may be produced in situ, that is, directly in the edible liquid or solid that it is desired to flavor if the edible material undergoes processing at a temperature and for a period sufficient to perform the reaction between the ingredients of the invention. If the plasma solids are reacted with ribose or ribose 5-phosphate in an aqueous medium, the reaction product may be recovered as a powder by spray drying or freeze drying. It has the characteristic flavor of boiled meat, particularly boiled beef, and imparts such flavor to food to which it is added. When a mixture of blood plasma solids and ribose or ribose 5-phosphate is heated in the presence of fat, a flavor closely similar to that of broiled or fried beef is obtained.

The ratio of ribose or ribose 5-phosphate to protein may be varied over a wide range, such as 0.01 part to 10 parts ribose or ribose 5-phosphate per part of protein, but best results are usually achieved within the narrower range of 0.1 part to 3 parts ribose or ribose 5-phosphate. The temperature and time for obtaining the desired flavor are inversely related in the usual manner. The temperature may be varied between 60° and 250°C. At temperatures of 100°C or less, the necessary processing time is between 10 minutes and 3 hours. At higher temperatures, as during frying or broiling, the necessary time varies between 15 seconds and 30 minutes, and factors other than temperature may affect optimum timing.

The flavoring composition of the invention is compatible with known seasoning agents and may be used jointly with such agents. The composition of the invention may be added to food as a dry powder, in the manner of salt or pepper, as a concentrated liquid in which water, an organic solvent or an edible oil provides the liquid phase, or as a semi-solid paste in combination with other ingredients which may have flavoring effects of their own.

A strong meat flavor may be imparted to non-meat food or to meat of poor quality by the flavoring agents of the invention whether the latter are prepared separately or directly in mixture with the edible material.

The following Examples are further illustrative of this invention.

EXAMPLE 1

Beef cattle blood was centrifuged to remove cells and other solids, and the supernatant was diluted with an equal volume of 95 percent ethanol. The precipitated protein was centrifuged to remove adherent liquid as far as possible and then dried in a vacuum. 10 g Cattle plasma powder so prepared and 5 g disodium ribose 5-phosphate were added to one liter water, and the mixture was boiled for 80 minutes to produce a first broth.

A second broth was prepared in the same manner from 10 g protein hydrolyzate obtained by complete hydrolysis of lean beef with hydrochloric acid, neutralization of the hydrolysis mixture with sodium hydroxide and spray drying, and from 5 g disodium ribose-5-phosphate.

A third broth was prepared from 5 g disodium ribose-5-phosphate and from 8.9 g of a mixture of 0.5 g serine, 0.5 g glutamic acid, 0.2 g proline, 1.0 g glycine, 4.0 g alanine, 0.4 g valine, 0.1 g methionine, 0.2 g isoleucine, 0.4 g leucine, 0.2 g ornithine, 0.2 g lysine, 0.6 g aspartic acid, 0.4 g threonine, and 0.2 g arginine, the mixture closely duplicating the composition of a beef protein hydrolyzate.

The three broths were presented in blind, organoleptic tests to a panel of 20 experienced tasters who were requested to state which broth had the strongest flavor of boiled beef, and which broth tasted most nearly like beef soup. A large majority of the tasters chose the first broth in both tests (17 and 18 respectively), and but one taster ascribed the strongest boiled meat flavor to the third broth. Two tasters preferred the second broth in both tests.

EXAMPLE 2

In a procedure otherwise identical with that described with reference to the first broth in Example 1, pig's blood was substituted for cattle blood, and the fourth broth so produced was set before the same panel together with the three broths of Example 1 for a comparison test.

Their verdict as to the second and third broths was the same, but they were split about equally with respect to the first and fourth broths, nine preferring the boiled meat flavor of the first broth, and eight choosing the fourth broth. The flavor most like beef soup was found in the first broth by nine panelists and in the fourth broth by the same number.

EXAMPLE 3

3.5 Liters water was mixed with 15 g cattle plasma powder prepared as in Example 1, 15 g ribose, 150 g carrots, 230 g onions, 70 g turnips, 100 g welsh onions, 380 g celery stems, 16 g salt, and 0.5 g beef fat. The mixture was quickly heated to a boil and simmered for 2 hours, whereupon it was filtered through cheese cloth. 3 g Monosidum glutamate, 0.1 g disodium inosinate, and some pepper were added to the filtrate.

A control was prepared in an analogous manner, but the plasma powder and ribose were replaced by 800 g lean beef.

The two liquids were presented to a panel of 10 tasters as consomme, and they were requested to state a preference. Only six preferred the genuine beef consomme while four selected the soup flavored according to this invention.

EXAMPLE 4

A liquid composition was prepared by mixing 200 ml soy sauce, 20 ml Worcestershire sauce, 20 ml distilled spirits (known in Japan as Shochu), 70 ml vinegar, 70 ml sweet Japanese rice wine (Mirin), 10 g sugar, 30 g millet jelly, 3 g monosodium glutamate, 0.08 g disodium inosinate, 0.08 g disodium guanylate, 15 g corn starch, some onion, garlic and white pepper powder, 2 ml sesame oil, 50 g egg white, and 20 g disodium ribose-5-phosphate.

A control composition was prepared from the same ingredients except for omission of the egg white and of the ribose-5-phosphate.

Soy bean curd (textured, purified soy protein) was dipped in the first composition and then fried in purified beef fat at 220°C for one minute. Slices of beef were dipped in the control composition and fried in the same manner. The fried products were subjected to an organoleptic test by a panel of seven tasters.

Six of the seven preferred the texture of the fried beef, but only four preferred the taste of the fried beef while three preferred the taste of the soy protein.

EXAMPLE 5

Baker's yeast was subjected to autolysis and concentrated to produce a yeast extract of pasty consistency. The paste was mixed intimately with one liter broth prepared as the first broth in Example 1. The mixture was partly evaporated in a vacuum to a water content of 35 percent by weight. There was obtained 750 g seasoning paste having a strong and pleasant beef flavor.

Beef cattle and pigs are the only practical sources of animal blood from which the plasma powder of the invention may be prepared under industrial conditions in developed countries. Sheep and goat blood may be mixed with other blood to the extent that it does not add an undesired flavor of its own to the seasoning composition of the invention. Blood of other animals, such as horses, useful in itself, is not normally available in adequate quantities.

What is claimed is:

1. A method of preparing a seasoning composition which comprises heating a mixture of 0.01 part to ten parts ribose or ribose-5-phosphate with one part plasma solids of beef cattle or pigs' blood at 60° to 250°C for 15 seconds to 3 hours until the mixture assumes the flavor of cooked beef, said parts being by weight.

2. A method as set forth in claim 1, wherein said plasma solids are insoluble in a mixture of equal parts of 95 percent ethanol and of blood plasma of said beef cattle or said pigs.

3. A method as set forth in claim 1, wherein said mixture is dispersed in water during said heating.

4. A method as set forth in claim 1, wherein said mixture is immersed in a liquid fat or oil during said heating.

5. A method as set forth in claim 1, wherein said mixture further contains an edible liquid or solid, said flavor being imparted to said edible liquid or solid by said heating.

* * * * *